(12) United States Patent
Bromley

(10) Patent No.: US 7,320,469 B2
(45) Date of Patent: Jan. 22, 2008

(54) RIDE HEIGHT CONTROL SYSTEM FOR WALKING BEAM SUSPENSION

(75) Inventor: Braden Bromley, Royal Oak, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 356 days.

(21) Appl. No.: 10/960,837

(22) Filed: Oct. 7, 2004

(65) Prior Publication Data

US 2006/0076757 A1    Apr. 13, 2006

(51) Int. Cl.
*B60G 17/04* (2006.01)

(52) U.S. Cl. .................................................. 280/5.514

(58) Field of Classification Search ............. 280/5.514, 280/677, 678, 124.159, 124.16
See application file for complete search history.

(56) References Cited

U.S. PATENT DOCUMENTS

| | | | | |
|---|---|---|---|---|
| 2,865,649 A * | 12/1958 | Chalmers et al. | ........... | 280/683 |
| 2,879,076 A * | 3/1959 | Stricker, Jr. | ................. | 280/676 |
| 3,520,548 A * | 7/1970 | McGee | ........................ | 280/678 |
| 4,202,564 A * | 5/1980 | Strader | ........................ | 280/678 |
| 4,706,988 A * | 11/1987 | Young | ......................... | 280/676 |
| 5,228,718 A * | 7/1993 | Kooistra | ..................... | 280/678 |
| 5,374,077 A * | 12/1994 | Penzotti et al. | ............. | 280/683 |
| 5,845,723 A * | 12/1998 | Hirahara et al. | ......... | 180/24.02 |
| 6,224,074 B1 * | 5/2001 | Cadden | ................... | 280/86.75 |
| 7,017,941 B2 * | 3/2006 | English | ....................... | 280/677 |
| 7,178,824 B2 * | 2/2007 | Ziech | ......................... | 280/678 |
| 2003/0205869 A1 * | 11/2003 | Schutt | ..................... | 280/5.514 |
| 2005/0205324 A1 * | 9/2005 | Saxon et al. | ................ | 180/209 |

* cited by examiner

*Primary Examiner*—Faye M. Fleming
(74) *Attorney, Agent, or Firm*—Carlson, Gaskey & Olds

(57) ABSTRACT

A trailer suspension system includes first and second axles with a walking beam interconnecting the first and second axles. An intermediate portion of the walking beam provides a fulcrum for the first and second axles. Air bags are arranged on the first and second axles. A ride height control valve is interconnected to the intermediate portion by a linkage. The ride height control valve regulates a pressure in the air bags in response to vertical movement of the intermediate portion. The linkage includes a flexible wishbone assembly that transmits vertical movement of the intermediate portion to the ride height control valve by rotating a lever on the ride height control valve.

13 Claims, 4 Drawing Sheets

RIDE HEIGHT CONTROL SYSTEM FOR WALKING BEAM SUSPENSION

BACKGROUND OF THE INVENTION

This invention relates to a ride height control system for a tractor trailer suspension, and more particularly, for walking beam trailer suspensions.

Ride height control devices are used in tractor trailer suspensions to automatically control ride height of the tractor trailer suspension under predetermined conditions. For example, in response to load on the trailer, a height control valve can be used to inflate or deflate suspension air bags. Many trailer suspensions utilize tandem axle arrangements in which each axle is supported on a frame by a four bar linkage so that each axle moves independently of one another. In these configurations, the height control valve is supported on the frame and a rod is interconnected between one of the axles and the frame. The rod is pivotally connected to a lever on the height valve control that is rotated in response to vertical movement of the axle to open and close the height control valve. Proper valve operation requires the lever to be rotated approximately ±10° in either direction. This rotation requires approximately 2 inches of suspension travel, which is easily attainable in a four bar linkage tandem axle arrangement.

Walking beam suspension configurations are desirable in tandem trailer axle arrangements because of their increased stability and reduced tendency to dock-walk. Walking beam suspensions eliminate two upper links on each side of the four bar linkage configurations and replace them with a beam pivotally connecting each side of the axles. Incorporation of a height control valve into such a configuration is problematic because the height control valve must attach at a mid-point of the walking beam to best average the suspension travel of front and rear axles in the tandem trailer axle arrangement. Unfortunately, there is very little travel at the mid-point and the height control valves currently available are not sensitive enough to operate desirably under the limited vertical travel of a walking beam configuration.

SUMMARY OF THE INVENTION AND ADVANTAGES

The present invention provides a trailer suspension system that includes first and second axles with a walking beam interconnecting the first and second axles. An intermediate portion of the beam provides a fulcrum for the first and second axles. Air bags are arranged on the first and second axles. A ride height control valve is interconnected to the intermediate portion by a linkage. The ride height control valve regulates a pressure in the air bags in response to vertical movement of the intermediate portion. The linkage includes a flexible wishbone assembly that transmits the vertical movement of the intermediate portion to the ride height control valve by rotating a lever on the ride height control valve.

The linkage includes a link having a first attachment point receiving a suspension input at the intermediate portion. The linkage transmits the suspension input to the ride height control valve to rotate the lever. The link includes a second attachment point spaced from the first attachment point, and a third attachment point that rotates about the second attachment point. The flexible wishbone assembly interconnects the third attachment point to a fourth attachment point on the lever. The link multiplies the movement of the intermediate portion to a degree sufficient for desired operation of the ride height control valve, and the flexible wishbone assembly permits the third and fourth attachment points to diverge from one another to accommodate different lengths and axes of rotation of the link and lever.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
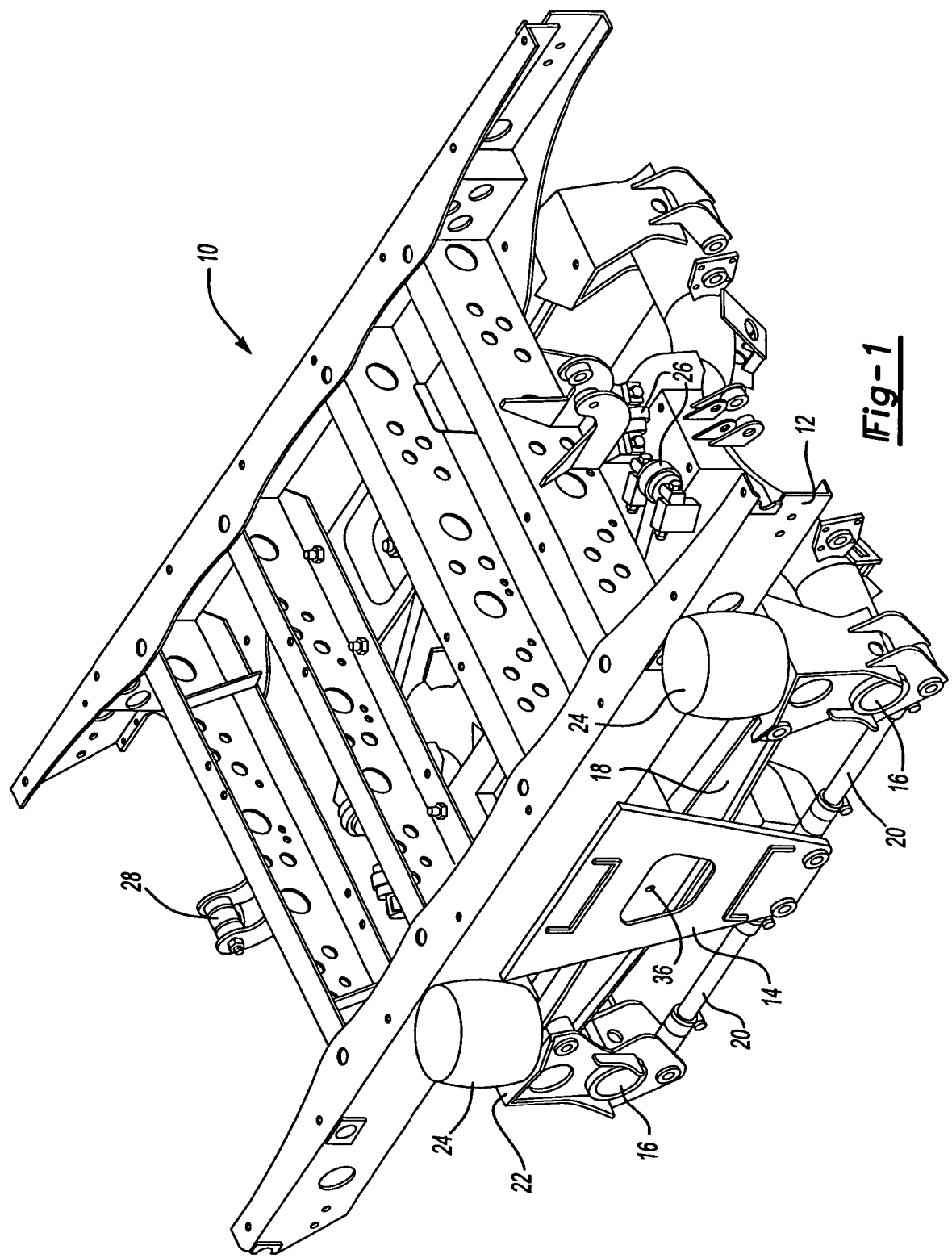
FIG. 1 is a perspective view of a walking beam trailer suspension.

A tandem trailer axle having a floating walking beam suspension system 10 is shown in FIG. 1. The suspension system 10 includes a frame 12 constructed from multiple components including axle brackets 14 for supporting axles 16. Upper portions of the axles 16 are pivotally connected to a walking beam 18. Vertical movement of one axle is transmitted to the other axle through the walking beam 18 in the opposite direction. Independent lower arms 20 support lower portions of axles 16. The axles 16 include air spring pads 22 at each end for supporting air bags 24 (only two shown). Torsion rods 26 arranged in a V-shape pattern are interconnected between the frame 12 and each axle 16 to provide lateral stability. A shock absorber 28 is interconnected between the frame 12 and each axle 16 (only one shown).

Figure 2:
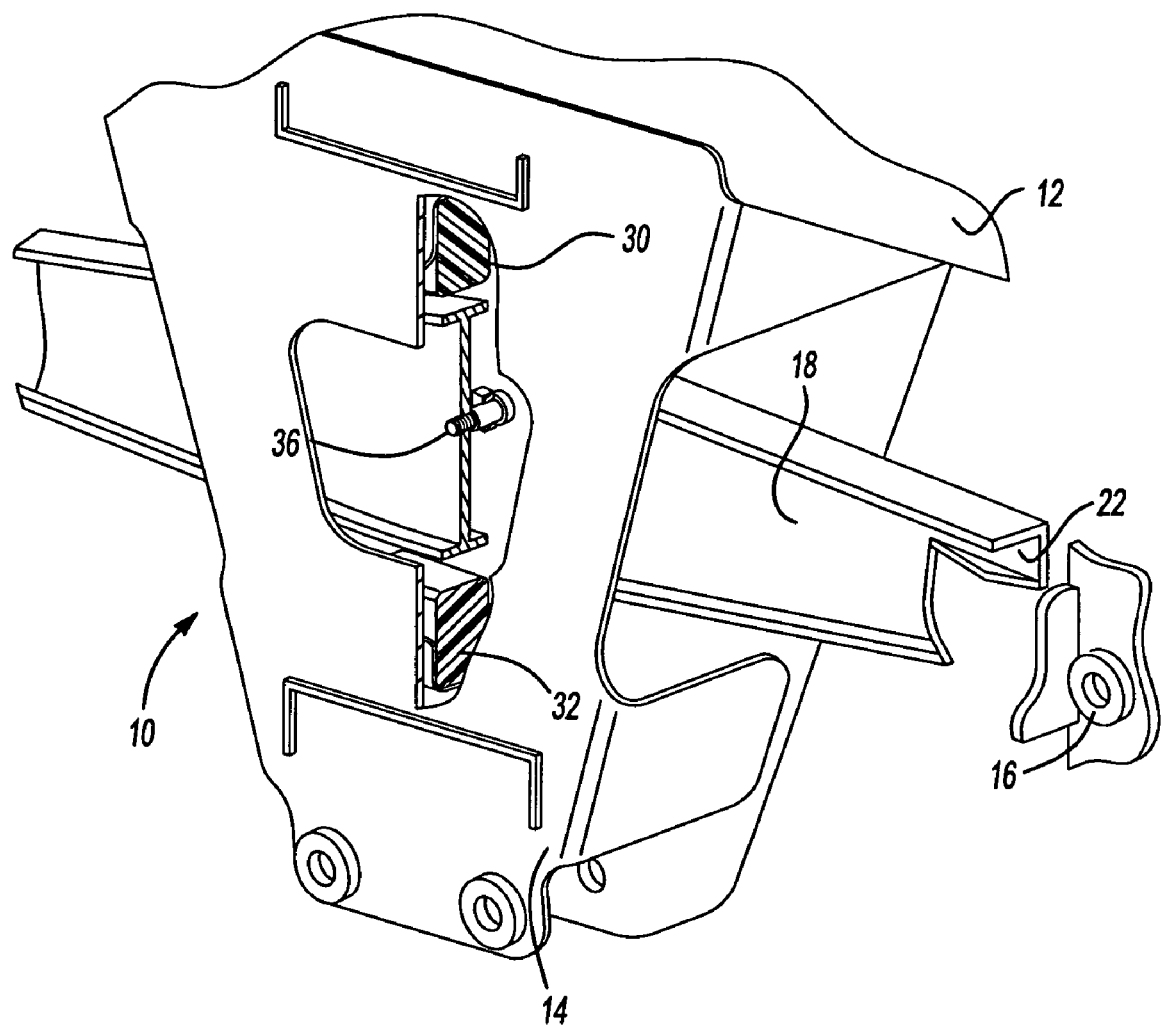
FIG. 2 is an enlarged perspective view of the walking beam trailer suspension of FIG. 1 incorporating the inventive ride height control system.
Figure 3:
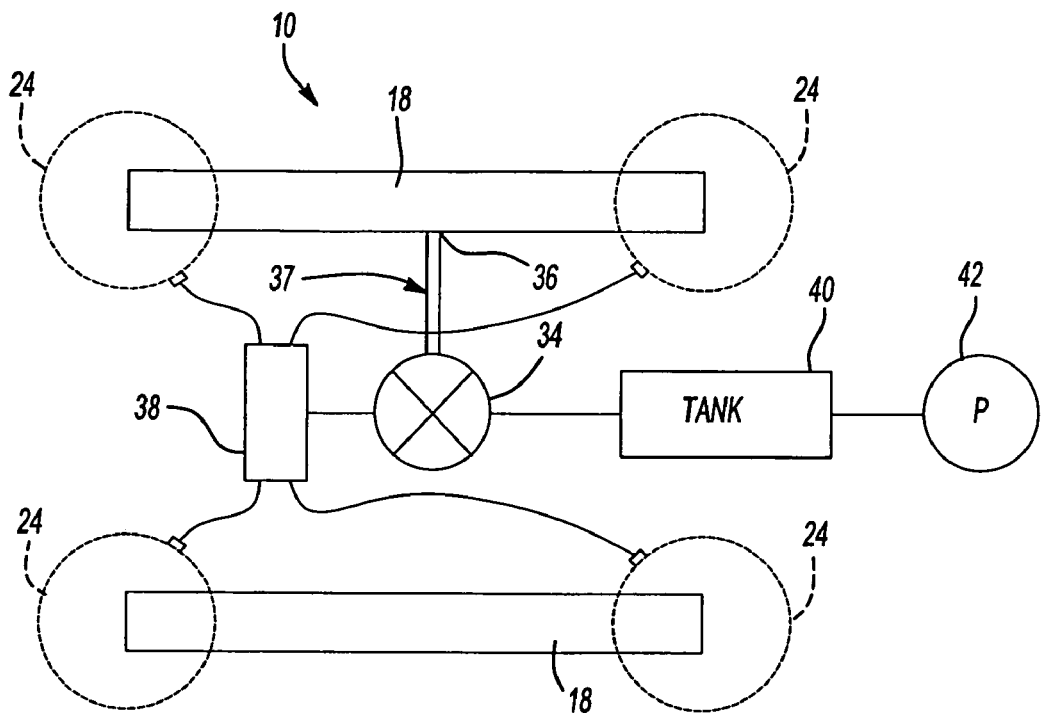
FIG. 3 is a schematic view of the inventive ride height control system.

The axle bracket 14 retains an intermediate portion of the walking beam 18, best shown in FIG. 2, between upper and lower rubber bumpers 30, 32. A top of the walking beam 18 rests on the upper bumper 30 when a trailer is at rest. The upper and lower bumpers 30, 32 permit very little vertical movement and are used to provide a fulcrum for the walking beam 18. Referring to FIG. 3, the inventive ride height control system uses an inventive linkage 37 interconnected between a height control valve 34 and an attachment point 36 at approximately the midpoint of the walking beam 18 so that the vertical movement at the midpoint is representative of an average axle vertical axle travel.

In the example shown in FIG. 3, the control valve 34 includes a pressurized air output fluidly connected to a manifold 38 that is in fluid connection with the air bags 24. The control valve 34 receives pressurized air from a storage tank 40 that is pressurized by a pump 42. The control valve 34 provides pressurized air to the air bags 24 when the attachment point 36 on the walking beam 18 moves upward relative to the frame 12 to raise the ride height of the trailer. Conversely, the control valve 34 bleeds air from the air bags 24 when the attachment point 36 on the walking beam 18 moves downward relative to the frame 12 to lower the ride height of the trailer. In this manner, a desired trailer ride height is maintained throughout various trailer loading conditions.

Figure 4:
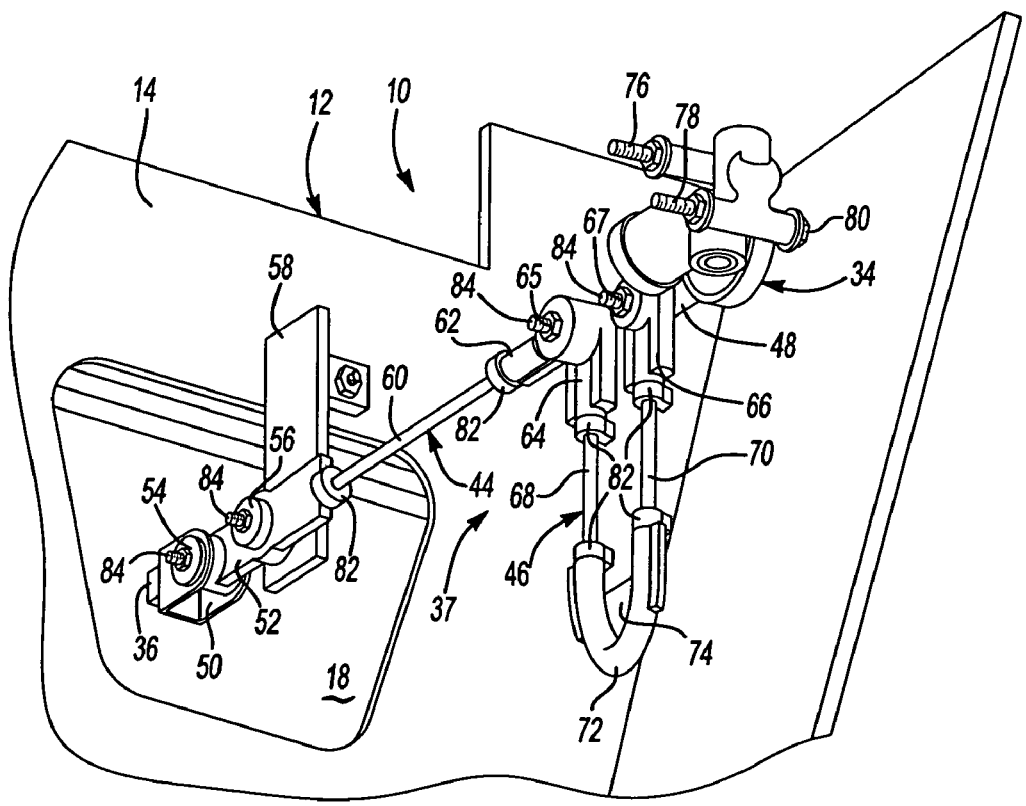
FIG. 4 is an enlarged perspective view of the ride height control system.

Referring to FIG. 4, an example of the linkage 37 is shown in more detail. The linkage 37 includes a link 44 connected to the walking beam 18 and a wishbone spring assembly 46 interconnected between the link 44 and a lever 48 on the height control valve 34. Rotation of the lever 48 opens and closes the control valve 34, which is supported by the frame 12.

A clevis 50 is secured to the walking beam 18 at the attachment point 36 using nylon washers to permit the clevis 50 to rotate about the attachment point 36 as the walking beam 18 pivots in the axle brackets 14. An end of a flexible joint 52 is secured to the clevis 50 at a clevis attachment point 54. A bracket 58, secured to the frame 12 at pivot point 56, pivotally supports the joint 52. A rigid rod 60 extends from the joint 52 to another flexible joint 62.

The spring assembly 46 includes a flexible joint 64 that is pivotally connected to the joint 62 at a link attachment point 65. Rigid rods 68, 70 are connected to ends of a U-shaped wishbone spring 72. Flexible joint 66 is secured to the rod 70 and is pivotally connected to the lever 48 at lever attachment point 67. The wishbone spring 72 includes webbing 74 that acts as a spring to bias the rods 68, 70 toward one another, similar to a cloths pin, to a position in which they are parallel to one another in the example shown.

The control valve 34 has an inlet 76 for receiving pressurized air and an outlet 78 for providing the pressurized air to the air bags 24. The control valve 34 also includes a bleed valve 80 for reducing the pressure from the air bags 24. The pressure through the inlet 76 and outlet 78 is regulated as the lever 48 rotates through its range of motion, as is known in the art.

Figure 5A:
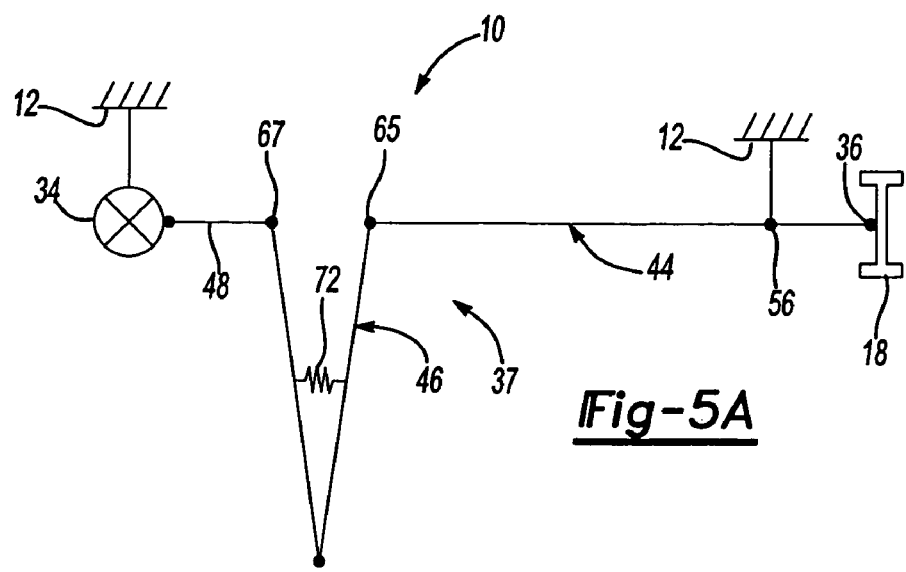
FIG. 5A a schematic view of the inventive ride height control system at a base ride height.
Figure 5B:
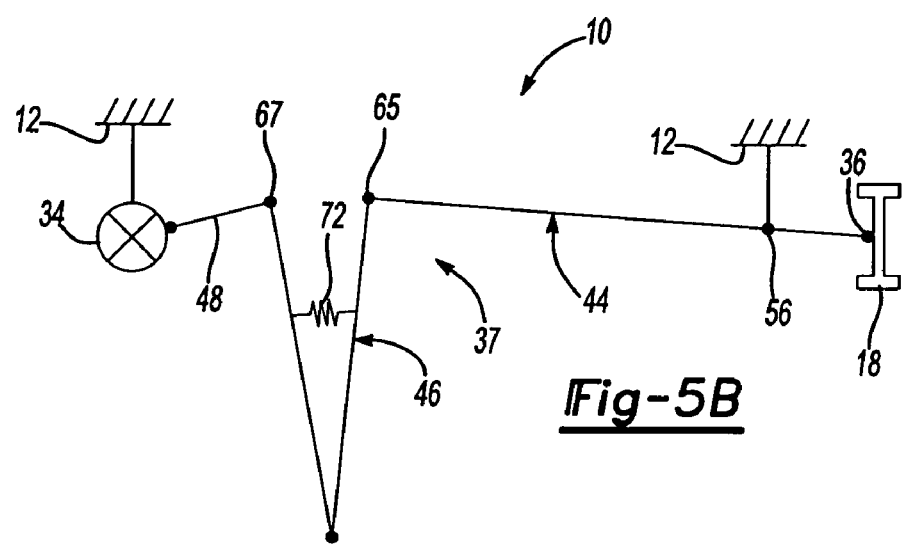
FIG. 5B a schematic view of the inventive ride height control system at a ⅛ inch rebound ride height.
Figure 5C:
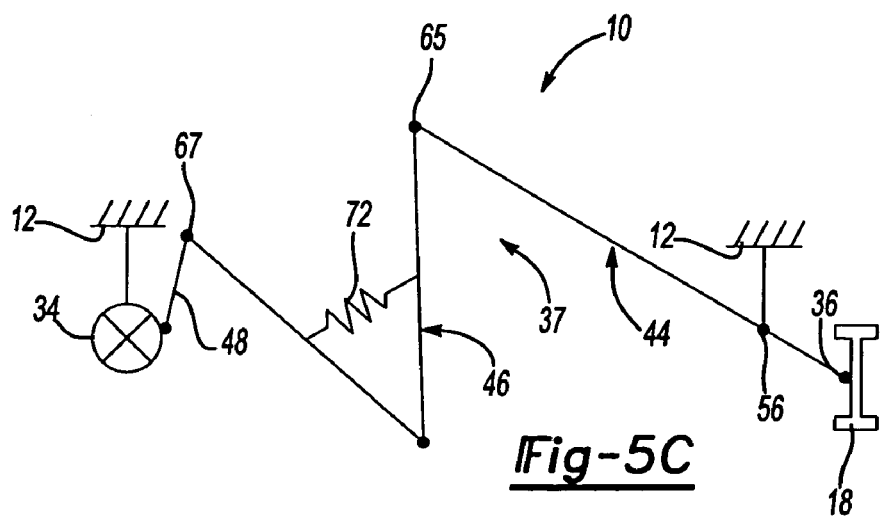
FIG. 5C a schematic view of the inventive ride height control system at a ¾ inch rebound ride height.

FIGS. 5A-5C schematically depict the operation of the inventive ride height control system. In one example, the distance between the walking beam attachment point 36 and the pivot point 56 is 2 inches; the distance between the pivot point 56 and the link attachment point 65 is 8 inches; the distance between the wishbone spring 72 and both link 65 and lever 67 attachment points is 6 inches; and the distance between the valve 34 and the lever attachment point 67 is 2 inches. FIG. 5A shows the suspension system 10 at a base ride height. The link 44 multiplies the vertical input from the walking beam 18. This is beneficial since the very small vertical movement from the walking beam 18 is insufficient to operate the control valve 34. However, since the link 44 and lever 48 are different lengths and rotate about separate axes, a device is needed to transmit the vertical input from the link 44 to rotate the lever 48 while enabling the attachment points 65, 67 to move apart from one another. The spring assembly 46 achieves this and also serves to return the linkage 37 to the "home" position, shown in FIG. 5A, once the ride height has been adjusted.

FIG. 5B depicts the walking beam 18 in a ⅛ inch rebound position. The linkage 37 multiplies this input and rotates the lever 48 approximately 15°, which is sufficient to desirably operate the control valve 34. The rods 60, 68, 70 transmit the movement from the walking beam 18 to the lever 48 while the wishbone spring 72 opens to accommodate the attachment point 65, 67 movement away from one another as the link 44 and lever 48 move about their pivotal axes. For a ¾ inch rebound position of the walking beam 18, shown in FIG. 5C, the linkage 37 multiplies the input and rotates the lever 48 approximately 80°.

The flexible joints 52, 62, 64, 66 and wishbone spring 72, which are preferably rubber, are preferably secured to the rigid rods 60, 68, 70 by clamps 82. Shoulder bolts 84 are preferably used at the attachment points 54, 56, 65, 67 so that the joints 52, 62, 64, 66 do not become pinched and are free to rotate about the axes provided by the bolts 84.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A trailer suspension system comprising:
   first and second axles with a beam interconnecting the first and second axles, an intermediate portion of the beam providing a fulcrum for the first and second axles;
   air bags arranged on the first and second axles; and
   a ride height control valve interconnected to the intermediate portion by a linkage, the ride height control valve regulating a pressure in the air bags in response to vertical movement of the intermediate portion transmitted through the linkage to the ride height control valve.

2. The trailer suspension system according to claim 1, wherein the linkage includes a link connected to the intermediate portion at a first attachment point, the link pivotally supported by a frame at a second attachment point, and including a third attachment point providing an input to the ride height control valve.

3. The trailer suspension system according to claim 2, wherein the ride height control valve includes a lever opening and closing a valve for regulating the pressure, and a flexible wishbone spring assembly interconnecting the third attachment point and the lever at opposing ends, the flexible wishbone spring assembly permitting the lever and the third attachment point to move apart from one another.

4. The trailer suspension system according to claim 3, wherein the flexible wishbone spring assembly includes a spring biasing the opposing ends to a desired position.

5. The trailer suspension system according to claim 3, wherein the flexible wishbone spring assembly includes spaced apart rods, each of the spaced apart rods being connected to the opposing ends of a flexible wishbone spring with the flexible wishbone spring biasing the spaced apart rods to a desired position.

6. The trailer suspension system according to claim 5, wherein the flexible wishbone spring includes webbing between the opposing ends biasing the spaced apart rods to the desired position.

7. The trailer suspension system according to claim 5, wherein the spaced apart rods pivot relative to the link and the lever respectively at the third attachment point and the lever.

8. The trailer suspension system according to claim 5, wherein the flexible wishbone spring is rubber.

9. The trailer suspension system according to claim 3, wherein the link includes a first flexible joint providing the first and second attachment points and a second flexible joint attached to the first flexible joint by a rod, the second flexible joint providing the third attachment point.

10. The trailer suspension system according to claim 9, wherein the first and second flexible joints are connected to the rod by clamps.

11. The trailer suspension system according to claim 9, wherein the flexible wishbone spring assembly includes first and second rods spaced apart from each other, each of the first and second rods being connected to the opposing ends of a flexible wishbone spring with the flexible wishbone spring biasing the first and second rods to a desired position, and third and fourth flexible joints respectively connected to the first and second rods, the second and third flexible joints secured at the third attachment point by a first shoulder bolt, and the fourth flexible joint secured to the lever at the fourth attachment point by a second shoulder bolt.

12. The trailer suspension system according to claim 1, wherein the first and second axles extend laterally, and the linkage extends generally parallel to the first and second axles.

13. The trailer suspension system according to claim 12, wherein the linkage is arranged generally perpendicular to the beam.

* * * * *